United States Patent
Kubota

(10) Patent No.: US 6,874,687 B2
(45) Date of Patent: Apr. 5, 2005

(54) APPARATUS AND METHOD FOR COLOR BALANCE ADJUSTMENT IN IMAGE SENSING APPARATUS

(75) Inventor: Koji Kubota, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/759,438

(22) Filed: Jan. 20, 2004

(65) Prior Publication Data
US 2004/0206826 A1 Oct. 21, 2004

(30) Foreign Application Priority Data
Jan. 20, 2003 (JP) ........................................ 2003-010617

(51) Int. Cl.[7] .............................................. G06K 7/10
(52) U.S. Cl. ............. 235/462.11; 235/469; 235/462.04; 235/462.41; 235/462.24; 382/167; 382/162; 382/275
(58) Field of Search ............................. 235/462.11, 469, 235/462.04, 462.24, 462.41; 382/162, 167, 275, 312; 348/362, 342; 396/301, 435, 505; 358/1.9, 29

(56) References Cited

U.S. PATENT DOCUMENTS

| | | | | |
|---|---|---|---|---|
| 5,119,178 A | * | 6/1992 | Sakata et al. | ............ 348/223.1 |
| 2001/0052992 A1 | * | 12/2001 | Tatsumi | ...................... 358/1.9 |
| 2002/0012064 A1 | * | 1/2002 | Yamaguchi | ................. 348/362 |
| 2002/0047988 A1 | * | 4/2002 | Matsumoto | ................. 351/206 |
| 2003/0123756 A1 | * | 7/2003 | Yamamoto | .................. 382/309 |
| 2004/0071370 A1 | * | 4/2004 | Yamazaki | ................... 382/312 |
| 2004/0186351 A1 | * | 9/2004 | Imaizumi et al. | ........... 600/160 |

FOREIGN PATENT DOCUMENTS

JP  9-9273 A  1/1997

* cited by examiner

Primary Examiner—Karl D. Frech
Assistant Examiner—Allyson N Trail
(74) Attorney, Agent, or Firm—Birch, Stewart, Kolasch & Birch, LLP

(57) ABSTRACT

The level of light that impinges upon a CCD is construed to be low when a high-sensitivity image sensing mode has been set. Gain for high-sensitivity image sensing is set in a gain adjusting circuit (color balance adjusting circuit) and a color balance adjustment is performed based upon the set gain. Thus an appropriate color balance adjustment is carried out even if light having a low level impinges upon the CCD.

2 Claims, 4 Drawing Sheets

Fig. 4

| MODE COLOR | HIGH-SENSITIVITY IMAGE SENSING MODE | ORDINARY IMAGE SENSING MODE |
|---|---|---|
| R | 1.8 | 1.7 |
| G | 1.0 | 1.0 |
| B | 1.5 | 1.4 |

# APPARATUS AND METHOD FOR COLOR BALANCE ADJUSTMENT IN IMAGE SENSING APPARATUS This nonprovisional application claims priority under 35 U.S.C. § 119(a) on Patent Application No. 2003-010617 filed in JAPAN on Jan. 20, 2003, the entire contents of which is hereby incorporated by reference.

BACKGROUND OF THE INVENTION

1. Field of the Invention

This invention relates to an apparatus and method for correcting color balance in an image sensing apparatus such as a digital still camera.

2. Description of the Related Art

In order to obtain an image having appropriate color in a color image sensing device, there are occasions where a correction is applied uniformly for each and every color. For example, see the specification of Japanese Patent Application Laid-Open No. 9-9273.

Often a solid-state electronic image sensing element such as a CCD is used as the image sensing element in a color image sensing device. In a solid-state electronic image sensing element of this kind, an incident light vs. output signal characteristic has linearity and the element outputs a signal that conforms to the level of the incident light. If the level of the incident light is low, however, the incident light vs. output signal characteristic may not necessarily be linear. This means that there are instances where a proper color balance adjustment cannot be performed even if a correction is applied uniformly color by color.

DISCLOSURE OF THE INVENTION

Accordingly, an object of the present invention is to perform a comparatively suitable color balance adjustment even in a case where the level of incident light is low.

According to the present invention, the foregoing object is attained by providing an apparatus for adjusting color balance of an image sensing apparatus, comprising: a solid-state electronic image sensing device for sensing the image of a subject and outputting color image data of a plurality of colors representing the image of the subject; a color balance adjusting device (color balance adjusting means), which is capable of performing amplification for each item of color image data, for carrying out a color balance adjustment by amplifying each item of color image data of the plurality of colors output from the solid-state electronic image sensing device; a determination device (determination means) for determining whether a high-sensitivity image sensing mode has been set; and a color balance control device (color balance control means) for controlling the color balance adjusting device, in accordance with a determination by the determination device that the high-sensitivity image sensing mode has been set, so as to change the amplification factor in comparison with an amplification factor that prevails when a determination made by the determination device is that the high-sensitivity image sensing mode has not been set.

The present invention also provides a method suited to the above-described apparatus for adjusting color balance of an image sensing apparatus. Specifically, the present invention provides a color balance adjustment method in an image sensing device having a solid-state electronic image sensing device for sensing the image of a subject and outputting color image data of a plurality of colors representing the image of the subject, and a color balance adjusting device, which is capable of performing amplification for each item of color image data, for carrying out a color balance adjustment by amplifying each item of color image data of the plurality of colors output from the solid-state electronic image sensing device, the method comprising the steps of: determining whether a high-sensitivity image sensing mode has been set; and controlling the color balance adjusting device, in accordance with a determination that the high-sensitivity image sensing mode has been set, so as to change the amplification factor in comparison with an amplification factor that prevails when a determination made is that the high-sensitivity image sensing mode has not been set.

In accordance with the present invention, color image data of a plurality of colors representing the image of a subject is output from the above-mentioned solid-state electronic image sensing device (the output may be a serial output or a parallel output) in response to the sensing of the image of a subject. Each item of the color image data of the plurality of colors is amplified on a per-color-image basis in the color balance adjusting device, whereby a color balance adjustment is performed.

In particular, according to the present invention, whether a high-sensitivity image sensing mode has been set is determined. It is construed that when the high-sensitivity image sensing mode has been set, this is a time when the luminance of the subject is low and so is the level of the light that impinges upon the solid-state electronic image sensing device.

If the high-sensitivity image sensing mode has been set, the color balance adjusting device is controlled in such a manner that the amplification factor will be changed in comparison with a case where the high-sensitivity image sensing mode has not been set. As a result, image data whose color balance has been adjusted comparatively accurately is obtained even in a case where the level of the incident light is low. For example, assume that the level of the output signal, which is obtained in accordance with the level of the incident light, is lower than the level of the output signal obtained normally, this occurring when the subject has low luminance. If the high-sensitivity image sensing mode has been set at this time, the color balance adjusting device would be controlled so as to enlarge the amplification factor in comparison with the amplification factor that prevails in a case where the high-sensitivity image sensing mode has not been sent.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates a table of gain quantities; and

DESCRIPTION OF THE PREFERRED EMBODIMENT

A preferred embodiment of the present invention will now be described in detail with reference to the drawings.

Figure 1:
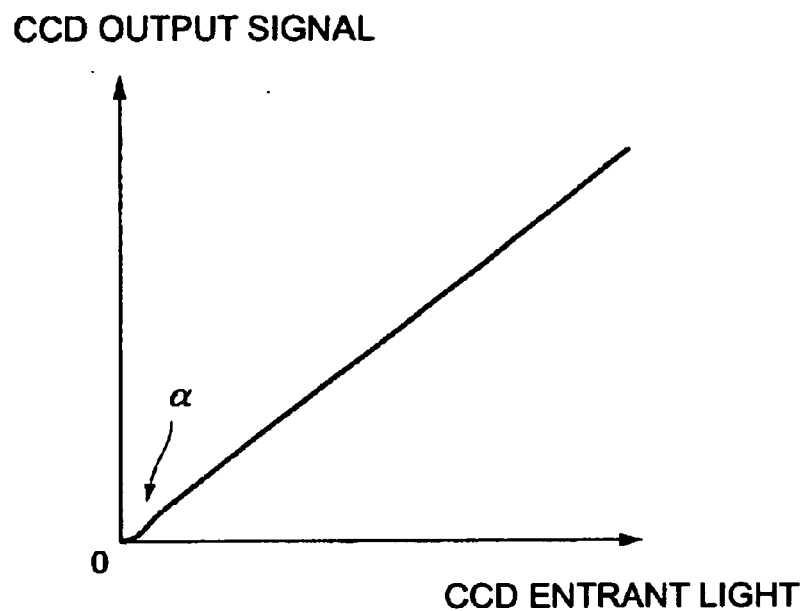
FIG. 1 is a graph illustrating an incident light vs. output signal characteristic of a CCD.
Figure 2:
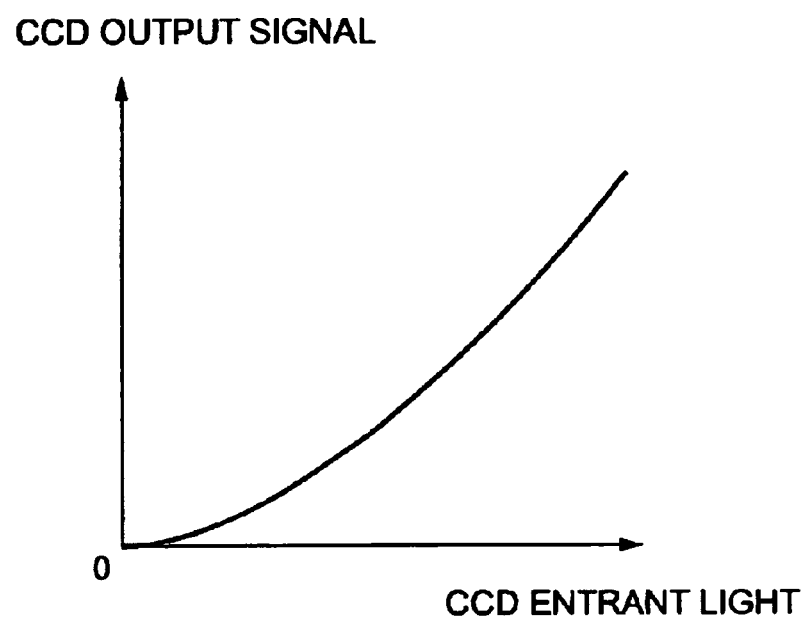
FIG. 2 is a graph illustrating, in enlarged form, the incident light vs. output signal characteristic of a CCD.

FIG. 1 is a graph illustrating an incident light vs. output signal characteristic of a CCD. FIG. 2 is a graph illustrating, in enlarged form compared with FIG. 1, the incident light vs. output signal characteristic representing near the limiting points of a CCD.

The incident light vs. output signal characteristic of a CCD usually has linearity and the CCD ordinarily outputs a signal conforming to the level of the incident light. However, when the level of the incident light is low (see FIG. 2, which is the portion indicated by symbol α in FIG. 1), often the incident light vs. output signal characteristic of a CCD becomes non-linear. The color of an image represented by a video signal obtained based upon the non-linear portion of the incident light vs. output signal characteristic of the CCD may differ from the rightful color of the image. A digital still camera according to this embodiment is adapted to change the amplification factor, which is used in adjustment of color balance, in dependence upon the level of the incident light.

Figure 3:
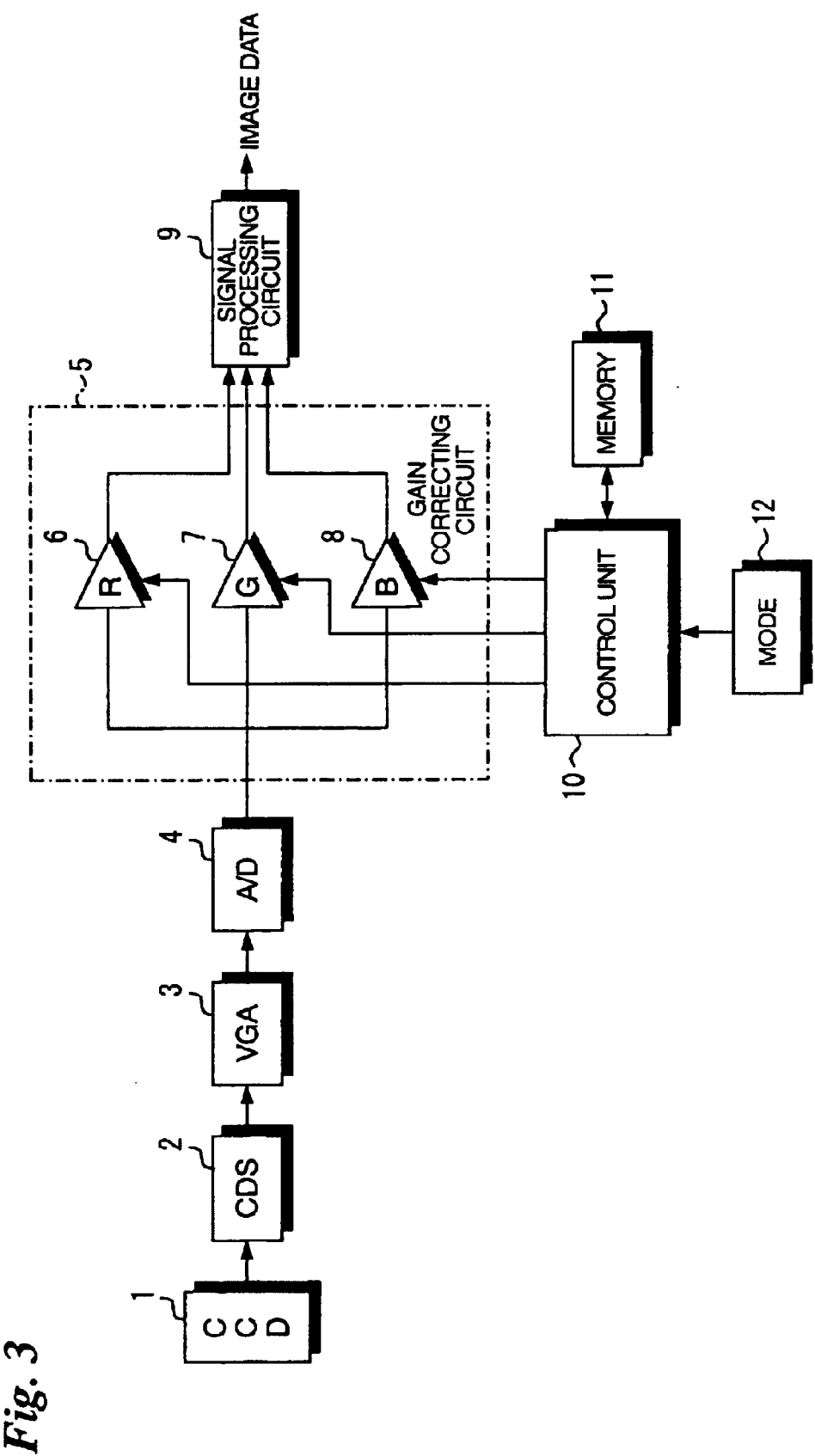
FIG. 3 is a block diagram illustrating the electrical structure of a digital still camera.

FIG. 3 is a block diagram illustrating the electrical structure of the digital still camera.

The overall operation of the digital still camera is controlled by a control unit 10.

The digital still camera is provided with a mode setting switch 12 by which a high-sensitivity image sensing mode can be set. It is construed that when the high-sensitivity image sensing mode has been set, the luminance of the subject is low and a CCD 1 outputs a video signal whose level is lower the level of a video signal that should otherwise be obtained, as mentioned above. For this reason, as will be described later, the amplification factor of a gain correcting circuit (color balance adjusting circuit) 5 is made larger than the amplification factor set in the usual image sensing mode.

A memory 11 is connected to the control unit 10. The memory stores not only prescribed data but also data indicating the gain quantities of gain corrections in the gain correcting circuit 5.

FIG. 4 is a table illustrating gain quantities that have been set in the memory 11.

As mentioned above, the gain quantity used in the gain correcting circuit 5 when the high-sensitivity image sensing mode has been set differs from that when the high-sensitivity image sensing mode has not been set (i.e., when the ordinary image sensing mode has been set).

Gain quantities applied to image data of respective ones of the colors have been stored in the gain quantity table for respective ones of R (red), G (green) and blue (B). The gain quantity applied to image data of the color green is a fixed value (1.0) regardless of whether the mode is the high-sensitivity image sensing mode or the usual image sensing mode. However, gain quantities applied to image data of the color red and image data of the color blue are such that the gain quantities applied in the high-sensitivity image sensing mode are greater than those applied in the ordinary image sensing mode.

Thus, a gain quantity applied in the high-sensitivity image sensing mode is greater than a gain quantity applied in the ordinary image sensing mode. Therefore, as mentioned above, a comparatively appropriate color balance adjustment can be executed even in a case where the level of the incident light is low and the only video signal obtained is one whose level is lower than that of the video signal that should rightfully be obtained in accordance with the incident light.

With reference again to FIG. 3, an RGB color filter is provided on the photoreceptor surface of the CCD 1. The image of a subject is sensed by the CCD 1. A light image representing the image of the subject is formed on the photoreceptor surface of the CCD 1 and an RGB analog color video signal conforming to the level of the incident light is outputted serially from the CCD 1. The video signal that has been output from the CCD 1 undergoes correlated double sampling in a CDS (correlated double sampling) circuit 2. The video signal output from the CDS circuit 2 is amplified by a VGA (voltage gain amplifier) 3 and the amplified video signal is input to an analog/digital converting circuit 4. The latter converts the analog video signal to serial color digital image data. The color image data is input to the gain correcting circuit 5.

The gain correcting circuit 5 includes an amplifying circuit 6 for amplifying digital image data of the color red, an amplifying circuit 7 for amplifying digital image data of the color green and an amplifying circuit 8 for amplifying digital image data of the color blue. A control signal, which is decided based upon the gain quantity table that has been stored in the memory 11, is supplied from the control unit 10 to the amplifying circuits 6, 7 and 8. As mentioned above, the control signal provided by the control unit 10 differs depending upon whether the high-sensitivity image sensing mode or the ordinary image sensing mode has been set. Upon entry of image data of the corresponding color from among the image data input to the gain correcting circuit 5, the corresponding amplifying circuit among the amplifying circuits 6, 7 and 8 performs amplification at the gain quantity decided by the control signal applied thereto. The output image data from the amplifying circuits 6, 7 and 8 is the output image data of the gain correcting circuit 5.

The image data output from the gain correcting circuit 5 is applied to a signal processing circuit 9. The latter subjects this signal to predetermined processing such as a gamma correction. The output image data of the signal processing circuit 9 is applied to a display controller (not shown), whereby an image represented by the image data obtained by image sensing is displayed on the display screen of a display unit (not shown). In response to pressing of a shutter-release button (not shown), the image data obtained as set forth above is compressed and then recorded on a recording medium such as a memory card.

Figure 5:
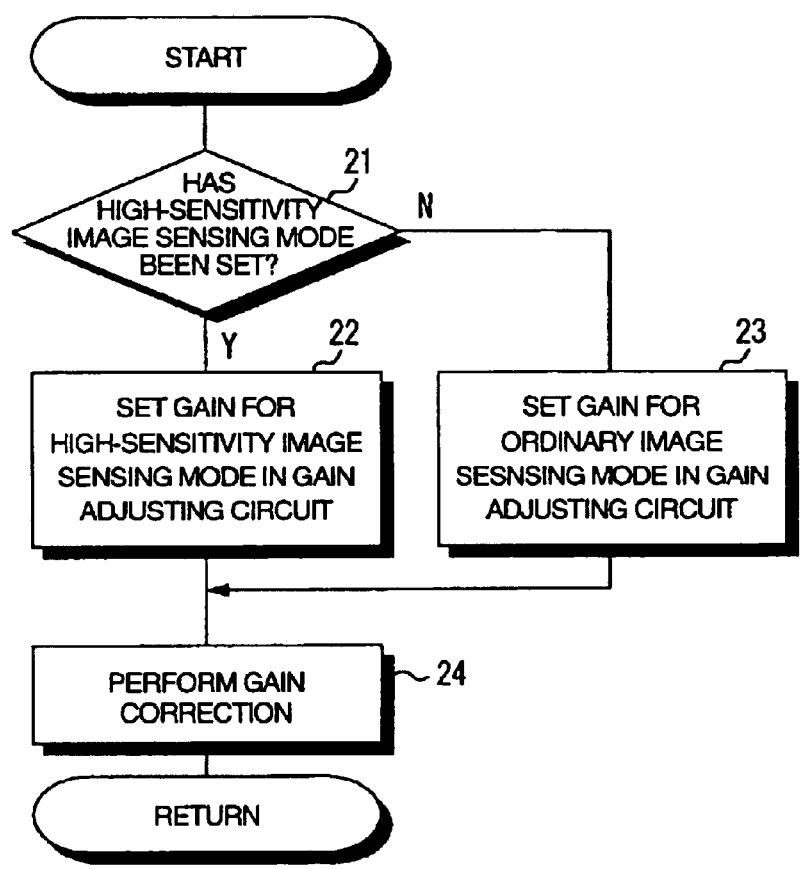
FIG. 5 is a flowchart illustrating processing executed by a digital still camera according to the present invention.

FIG. 5 is a flowchart illustrating processing for gain correction executed by the digital still camera.

First, it is determined whether the high-sensitivity image sensing mode has been set (step 21).

If the high-sensitivity image sensing mode has been set ("YES" at step 21), then, as described above, the gain quantity for the high-sensitivity image sensing mode is read from the memory 11 and the amplification factor conforming to the read gain quantity is set in each of the amplifying circuits 6, 7 and 8 constituting the gain correcting circuit 5. Each item of color image data is subjected to a gain correction (color balance adjustment) based upon the gain quantity that has been set (step 24).

If the ordinary image sensing mode has been set ("NO" at step 21), then the gain quantity for the ordinary image sensing mode is read from the memory 11 and the amplification factor conforming to the read gain quantity is set in each of the amplifying circuits 6, 7 and 8. Gain is corrected depending upon the set gain quantity (step 24).

Though the above-described processing steps are implemented by hardware, it may be so arranged that the processing is executed by software.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for adjusting color balance of an image sensing apparatus, comprising:

a solid-state electronic image sensing device for sensing the image of a subject and outputting color image data of a plurality of colors representing the image of the subject;

a color balance adjusting device, which is capable of performing amplification for each item of color image data, for carrying out a color balance adjustment by amplifying each item of color image data of the plurality of colors output from said solid-state electronic image sensing device;

a determination device for determining whether a high-sensitivity image sensing mode has been set; and a color balance control device for controlling said color balance adjusting device, in accordance with a determination by said determination device that the high-sensitivity image sensing mode has been set, in such a manner that an amplification factor will change in comparison with an amplification factor that prevails when a determination made by said determination device is that the high-sensitivity image sensing mode has not been set.

2. A color balance adjustment method in an image sensing apparatus having a solid-state electronic image sensing device for sensing the image of a subject and outputting color image data of a plurality of colors representing the image of the subject, and a color balance adjusting device, which is capable of performing amplification for each item of color image data, for carrying out a color balance adjustment by amplifying each item of color image data of the plurality of colors output from the solid-state electronic image sensing device, said method comprising the steps of:

determining whether a high-sensitivity image sensing mode has been set; and controlling the color balance adjusting device, in accordance with a determination that the high-sensitivity image sensing mode has been set, in such a manner that an amplification factor will change in comparison with an amplification factor that prevails when a determination made is that the high-sensitivity image sensing mode has not been set.

* * * * *